Patented Dec. 3, 1940

2,224,022

UNITED STATES PATENT OFFICE 2,224,022

MALEIC ACID AND FUMARIC ACID DERIVATIVES

Peter Kurtz, Leverkusen-Wiesdorf, Germany, assignor, by mesne assignments, to General Aniline & Film Corporation, New York, N. Y., a corporation of Delaware No Drawing. Application August 1, 1939, Serial No. 287,745. In Germany August 4, 1938

3 Claims. (Cl. 260—464)

The present invention relates to new maleic acid or fumaric acid derivatives and to a process for preparing the same.

It has been found that functional derivatives of propiolic acid are capable of undergoing an addition reaction with hydrogen cyanide. This addition reaction is preferred to be carried out in the presence of alkaline reacting agents and at a temperature between about 0°–150° C. It is preferred to work with an anhydrous hydrogen cyanide though the working with an aqueous hydrogen cyanide or in the presence of other diluents is not excluded from the scope of this invention. Suitable alkaline reacting agents are, for instance, the alkali- and alkaline earth metal salts of hydrogen cyanide or alkali metal salts of other weak acids, such as potassium carbonate; furthermore, there can be employed ammonia or amines. Such alkaline reacting agents are usually employed in an amount of about 0.1–10% calculated on the amount of the propiolic acid derivative. As a matter of fact, the reaction can be performed at an elevated pressure. As propiolic acid derivatives there are preferably employed propiolic acid esters, for instance, the methyl and the ethyl esters.

The resulting addition products may be defined by the following formula:

it being understood that they probably represent a mixture of the cis- and the trans-products. Compounds of the above type have not been described in literature and could not be prepared according to anyone of the hitherto known methods. They represent valuable intermediates for the preparation of dyestuffs, pharmaceutical products, textile assistants, artificial masses and the like.

Example 46 parts of propiolic acid methyl ester and 0.5 part of potassium cyanide are mixed with 16 parts of anhydrous hydrogen cyanide. A spontaneous reaction occurs, heat being evolved thereby. By cooling and (at the end of the reaction) by heating the temperature is kept at about 45–50° C. for about 4 hours. By distillation in vacuo there are obtained besides the unchanged starting material about 25% (calculated upon propiolic acid methyl ester) of a liquid boiling at 85–94° C. under 11 mm. pressure. This liquid probably represents a mixture of the cis- and the trans-product and, after recrystallization from a mixture of diethyl ether and benzine, it shows the melting point 35° C. The unchanged starting material can be reused for another reaction. If calculated upon the amount of hydrogen cyanide, the yield is about 80%.

With a similar result the propiolic acid methyl ester can be replaced by the corresponding ethyl or propyl ester.

I claim:

1. The process which comprises causing hydrogen cyanide to react upon propiolic acid esters of the following general formula CH≡C—COO·X wherein X stands for alkyl in the presence of alkaline reacting agents.

2. The process as claimed in claim 1 wherein an anhydrous hydrogen cyanide is employed.

3. The products of the formula:

PETER KURTZ.